US012179577B2

(12) United States Patent
Haslam et al.

(10) Patent No.: US 12,179,577 B2
(45) Date of Patent: Dec. 31, 2024

(54) FUEL MEASUREMENT DEVICE WITH FUEL PASSAGE AND FUEL LEVEL SENSOR

(71) Applicant: TF TECHNOLOGIES, LLC, Salt Lake City, UT (US)

(72) Inventors: Mark Haslam, Bountiful, UT (US); Jan DeHoop, Sandy, UT (US)

(73) Assignee: TF TECHNOLOGIES, LLC, Salt Lake City, UT (US)

( * ) Notice: Subject to any disclaimer, the term of this patent is extended or adjusted under 35 U.S.C. 154(b) by 676 days.

(21) Appl. No.: 17/296,663

(22) PCT Filed: Oct. 9, 2019

(86) PCT No.: PCT/US2019/055417
§ 371 (c)(1),
(2) Date: May 25, 2021

(87) PCT Pub. No.: WO2020/139441
PCT Pub. Date: Jul. 2, 2020

(65) Prior Publication Data
US 2022/0024298 A1    Jan. 27, 2022

Related U.S. Application Data (60) Provisional application No. 62/786,128, filed on Dec. 28, 2018.

(51) Int. Cl.
*G01F 23/00* (2022.01)
*B60K 15/04* (2006.01)
(Continued)

(52) U.S. Cl.
CPC ................ *B60K 15/04* (2013.01); *B60Q 9/00* (2013.01); *G01F 23/263* (2013.01); *B60K 2015/03217* (2013.01)

(58) Field of Classification Search
CPC .... B60K 15/03; B60K 15/04; B60K 15/0406; B60K 2015/03217; G01F 23/24;
(Continued)

(56) References Cited

U.S. PATENT DOCUMENTS 1,217,693 A * 2/1917 Boyce ..................... G01F 23/02
73/294
1,660,814 A * 2/1928 Persons ................... G01F 23/16
73/299

(Continued)

FOREIGN PATENT DOCUMENTS

CN    101213443 B    12/2011
CN    101194160 B    1/2012
(Continued)

OTHER PUBLICATIONS

ESPACENET Machine Translation of WO 2017/123049 A1 Originally Published On Jul. 20, 2017. (Year: 2017).*

*Primary Examiner* — Alexander A Mercado
(74) *Attorney, Agent, or Firm* — Fabian VanCott; Steven L. Nichols (57) ABSTRACT

In one example in accordance with the present disclosure, a fuel measurement device is described. The fuel measurement device includes a collar to clamp against a neck of a fuel tank. A fuel port is coupled to the collar. The fuel port includes 1) a passage through which fuel is passed into the fuel tank and 2) a fuel level sensor that includes an elongated probe inserted into the fuel tank.

20 Claims, 7 Drawing Sheets

(51) Int. Cl.
*B60Q 9/00* (2006.01)
*G01F 23/263* (2022.01)
*B60K 15/03* (2006.01)

(58) Field of Classification Search
CPC ...... G01F 23/242; G01F 23/241; G01F 23/26; G01F 23/265; G01F 23/263; B60Q 9/00
See application file for complete search history.

(56) References Cited

U.S. PATENT DOCUMENTS

| | | | | |
|---|---|---|---|---|
| 3,693,738 | A * | 9/1972 | Andrews | G01G 19/10 177/208 |
| 4,102,191 | A * | 7/1978 | Harris | G01F 23/36 340/625 |
| 4,462,620 | A * | 7/1984 | Bambenek | B60K 15/04 277/606 |
| 4,594,892 | A | 6/1986 | Asmundsson | |
| 4,987,776 | A * | 1/1991 | Koon | G01F 23/266 73/304 C |
| 5,427,263 | A * | 6/1995 | Bowles | F16L 37/133 285/192 |
| 5,652,392 | A * | 7/1997 | Lawson | G01L 9/12 702/140 |
| 5,660,206 | A * | 8/1997 | Neal | F16K 15/148 137/854 |
| 5,661,228 | A * | 8/1997 | Young | G01F 23/16 73/299 |
| 5,826,918 | A * | 10/1998 | Bowles | F16L 37/0985 285/24 |
| 6,002,328 | A | 12/1999 | Wallrafen | |
| 6,260,578 | B1 * | 7/2001 | Kuehnemund | B60K 15/04 137/515.5 |
| 6,283,142 | B1 * | 9/2001 | Wheeler | F02M 37/0094 123/514 |
| 6,490,920 | B1 * | 12/2002 | Netzer | G01F 23/268 73/304 C |
| 6,607,005 | B2 | 8/2003 | Viebahn | F04F 5/54 137/142 |
| 6,666,238 | B1 * | 12/2003 | Crowley | B60K 15/04 285/80 |
| 6,880,586 | B2 * | 4/2005 | Crowley | B60K 15/04 285/80 |
| 6,968,739 | B1 * | 11/2005 | Baron | G01F 23/36 73/1.73 |
| 7,258,005 | B2 * | 8/2007 | Nyce | G01F 23/263 73/304 C |
| 7,506,541 | B2 * | 3/2009 | Woodard | G01F 22/00 73/304 R |
| 7,614,854 | B2 * | 11/2009 | Palvolgyi | F02M 37/10 417/40 |
| 7,988,086 | B2 * | 8/2011 | Tichborne | G01R 31/52 324/72 |
| 8,464,764 | B1 * | 6/2013 | Milsom | B60K 15/03519 137/202 |
| 8,510,065 | B2 * | 8/2013 | Bommer | G01F 23/806 73/304 R |
| 8,620,603 | B1 | 12/2013 | Hicks | |
| 8,770,048 | B2 * | 7/2014 | Khuzwayo | G01N 1/16 73/864.51 |
| 8,776,595 | B2 * | 7/2014 | Milone | G01F 23/164 73/304 C |
| 8,869,612 | B2 * | 10/2014 | Chen | G01F 23/26 73/304 C |
| 8,935,109 | B2 | 1/2015 | Aharoni | |
| 9,080,529 | B1 | 7/2015 | Klughart | |
| 9,267,835 | B2 * | 2/2016 | Takahashi | G01F 25/20 |
| 9,341,301 | B2 * | 5/2016 | Davito | F16L 55/168 |
| 9,417,635 | B2 * | 8/2016 | Hampton | G01F 23/268 |
| 9,557,207 | B2 * | 1/2017 | Stevenson | G08B 19/02 |
| 9,677,508 | B2 | 6/2017 | Conti | |
| 9,776,506 | B2 * | 10/2017 | Whelan | B60K 15/04 |
| 9,829,370 | B2 * | 11/2017 | Dudar | G01F 23/32 |
| 9,835,516 | B2 * | 12/2017 | Thakkar | B60K 15/04 |
| 9,975,423 | B2 * | 5/2018 | Karlsson | B60K 15/0403 |
| 10,101,191 | B2 * | 10/2018 | McBride | G01F 23/296 |
| 10,203,238 | B2 * | 2/2019 | Barrett | G01F 23/263 |
| 10,267,665 | B2 * | 4/2019 | McBride | H04L 67/12 |
| 11,156,492 | B2 * | 10/2021 | Souques | G01F 23/802 |
| 11,530,658 | B1 * | 12/2022 | Dudar | F02D 41/0032 |
| 2003/0000303 | A1 * | 1/2003 | Livingston | G01F 23/266 73/304 C |
| 2006/0027284 | A1 * | 2/2006 | Strasser | G01F 23/22 141/95 |
| 2006/0111851 | A1 | 5/2006 | Potgieter | |
| 2006/0201578 | A1 | 9/2006 | Schillinger | |
| 2007/0240506 | A1 * | 10/2007 | Lin | G01F 23/268 73/304 R |
| 2008/0034847 | A1 | 2/2008 | Lee | |
| 2008/0156800 | A1 | 7/2008 | Mougenot | |
| 2009/0153155 | A1 * | 6/2009 | Chambon | A47J 37/1266 324/698 |
| 2009/0301190 | A1 * | 12/2009 | Ross, Jr. | G01F 23/265 73/304 C |
| 2011/0043224 | A1 * | 2/2011 | Yu | G01N 33/03 324/658 |
| 2011/0120219 | A1 * | 5/2011 | Barlesi | G01F 23/266 73/304 C |
| 2012/0138779 | A1 * | 6/2012 | Martinez Valdegrama | G01F 23/2922 250/577 |
| 2013/0025574 | A1 | 1/2013 | Payne | |
| 2014/0020463 | A1 * | 1/2014 | Ikeya | G01F 23/263 73/304 C |
| 2014/0352428 | A1 * | 12/2014 | Kato | G01F 23/268 73/304 C |
| 2014/0375321 | A1 * | 12/2014 | Ikeya | G01N 27/02 324/324 |
| 2015/0068301 | A1 | 3/2015 | Ross, Jr. et al. | |
| 2020/0072651 | A1 * | 3/2020 | Tadas | G01F 23/268 |

FOREIGN PATENT DOCUMENTS

| | | |
|---|---|---|
| CN | 102735302 A | 10/2012 |
| CN | 203422138 U | 2/2014 |
| CN | 203981226 U | 12/2014 |
| CN | 205601597 U | 9/2016 |
| CN | 106894923 A | 6/2017 |
| CN | 106050754 B | 10/2017 |
| DE | 3243839 A1 | 5/1984 |
| DE | 3036347 C2 | 1/1991 |
| DE | 202009009647 U1 * | 11/2009 ........... F01N 3/2066 |
| DE | 102013012100 A1 | 1/2014 |
| DE | 102015210144 A1 | 12/2016 |
| EP | 2289729 A1 | 3/2011 |
| FR | 2893546 A1 | 5/2007 |
| JP | 09152368 A | 6/1997 |
| JP | 5430564 B2 | 3/2014 |
| KR | 1020100068732 A | 6/2010 |
| KR | 101503053 B1 | 3/2015 |
| RU | 2067289 C1 | 9/1996 |
| RU | 46576 C1 | 7/2005 |
| RU | 2344381 C1 | 1/2009 |
| RU | 183632 U1 | 9/2018 |
| WO | 2013140375 A2 | 9/2013 |
| WO | 2017093921 A1 | 6/2017 |
| WO | WO-2017123049 A1 * | 7/2017 ............. B60K 15/03 |
| WO | 2018002682 A1 | 1/2018 |

* cited by examiner

FUEL MEASUREMENT DEVICE WITH FUEL PASSAGE AND FUEL LEVEL SENSOR

BACKGROUND

Various pieces of equipment, including vehicles, use liquid fuel as a fuel source. Some organizations have large quantities of equipment and/or vehicles, and fuel costs are a significant portion of their operating budget. Accordingly, such organizations, as well as a variety of other users, may take great care in tracking use and management of their fuel.

BRIEF DESCRIPTION OF THE DRAWINGS

The accompanying drawings illustrate various examples of the principles described herein and are part of the specification. The illustrated examples are given merely for illustration, and do not limit the scope of the claims. It should be further understood that the drawings are not necessarily drawn to scale and that, unless otherwise indicated, they are merely intended to conceptually illustrate the structures and procedures described herein.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Accurate measurement of fuel volume in a fuel tank is desirable as it may lead to more information regarding fuel consumption. Additional information on fuel consumption can lead to more effective use of fuel resources and thus may reduce a fuel cost for an equipment operator. For example, inadequate tank measurement accuracy may prohibit a fleet operator from determining 1) whether fuel is being lost through pilferage, 2) whether fuel is being lost through leakage, 3) whether fuel dispensed from a fuel vendor is less than the amount the vendor pump indicates on a sales record, and/or 4) how much a particular driver is affecting the potential fuel economy of a particular truck.

Accordingly, the present specification describes a method and system for effectively and accurately measuring the amount of fuel in a fuel tank. Specifically, the present specification describes a fuel measurement device that provides accurate measurements of fuel levels in a fuel tank. This fuel level information itself is useful in managing fuel consumption for a vehicle or a fleet of vehicles. Moreover, the fuel level information when combined with other vehicle characteristic information can provide additional fuel consumption information that is useful to a vehicle or fleet operator in managing fuel consumption for the vehicle or fleet. The fuel measurement device also includes a passage through which fuel can be added to a fuel tank. In this example, the fuel level sensor is inserted into the fuel tank through the passage. That is, the fuel level sensor operates through the passage through which fuel is pumped so that a second opening is not needed for the fuel level sensor.

Of particular relevance, the fuel measurement device can be attached to a fuel tank without puncturing or otherwise structurally altering the fuel tank. That is, no additional holes, or cavities need be formed in the fuel tank to insert the fuel level sensor described herein.

Specifically, the present specification describes a fuel measurement device. The fuel measurement device includes a collar to clamp against, or around, a neck of a fuel tank. A fuel port is coupled to the collar and includes a passage through which fuel is passed into the fuel tank. The fuel port also includes a fuel level sensor that extends through the passage into the fuel tank and includes an elongated probe.

The present specification also describes a method. According to the method, a collar is affixed to a neck of a fuel tank opening. A fuel port that includes a fuel passage and fuel level sensor is inserted through the fuel tank opening. The fuel port is then affixed to the collar via mechanical fasteners.

The present specification also describes a fuel management system that includes at least one fuel measurement device as described above. The fuel management system also includes a computing system with a data connection to the fuel measurement device(s). The computing system receives fluid level measurement(s) from each fuel level sensor and determines a quantity of fuel in the respective fuel tanks.

In summary, using such a fuel measurement device 1) allows for accurate determination of fuel levels within a fuel tank; 2) is used with a fuel tank without structural alteration of the fuel tank; and 3) provides data which alone, or with other data, provides detailed information regarding fuel usage of a particular vehicle.

As used in the present specification and in the appended claims, the term "liquid fuel" or "fuel" refers to a variety of fuel types such as gasoline and diesel fuel.

Figure 1:
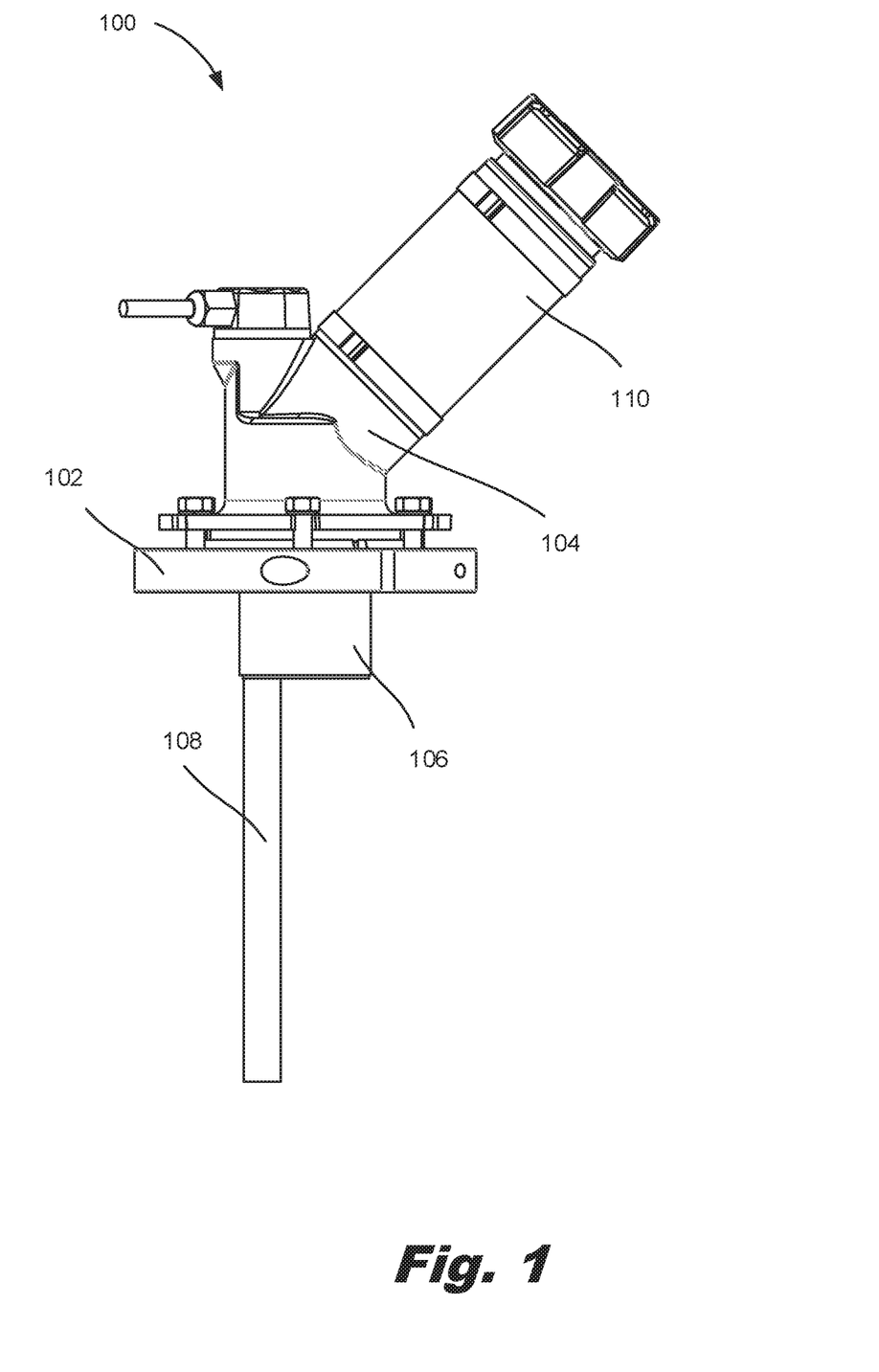
FIG. 1 is an isometric view of a fuel measurement device with a fuel passage and a fuel level sensor, according to an example of the principles described herein.

Turning now to the figures, FIG. 1 is a diagram of a fuel measurement device (100) with a fuel passage (106) and a fuel level sensor (108), according to an example of the principles described herein. As described above, the fuel measurement device (100) is used to provide accurate information regarding fuel levels within a fuel tank on a piece of equipment or a vehicle.

The fuel measurement device (100) includes a fuel port (104) that 1) mounts a fuel level sensor (108) in a fuel tank of a piece of equipment or a vehicle, like a semi-truck and that 2) allows fuel to pass to the fuel tank via a passage (106). For example, the fuel port (104) may mount the fuel level sensor in a crane, pump, or other piece of equipment. The fuel level sensor (108) is inserted into the fuel tank in a way that does not inhibit the addition of more fuel, thus allowing the mounting of the fuel level sensor (108) in an existing piece of equipment without drilling new holes in the tank wall.

As will be described below, the fuel level sensor (108) is connected to a computing system, which may be a mobile communication telematics system disposed in a cab of the vehicle to inform the driver, and in some cases a home base of the vehicle of various fuel consumption characteristics. Examples of such fuel consumption characteristics include as examples, how much fuel is in the tank(s), how much has been added, how much has been taken out, and how much is being used as the piece of equipment, or vehicle, is being operated. In some examples this information may be used along with other information, such as an odometer readout, tachometer readout, clock, etc. to determine rate of fuel consumption, for example as gallons per mile, gallons per hour, or gallons per RPM cycle.

Figure 3:
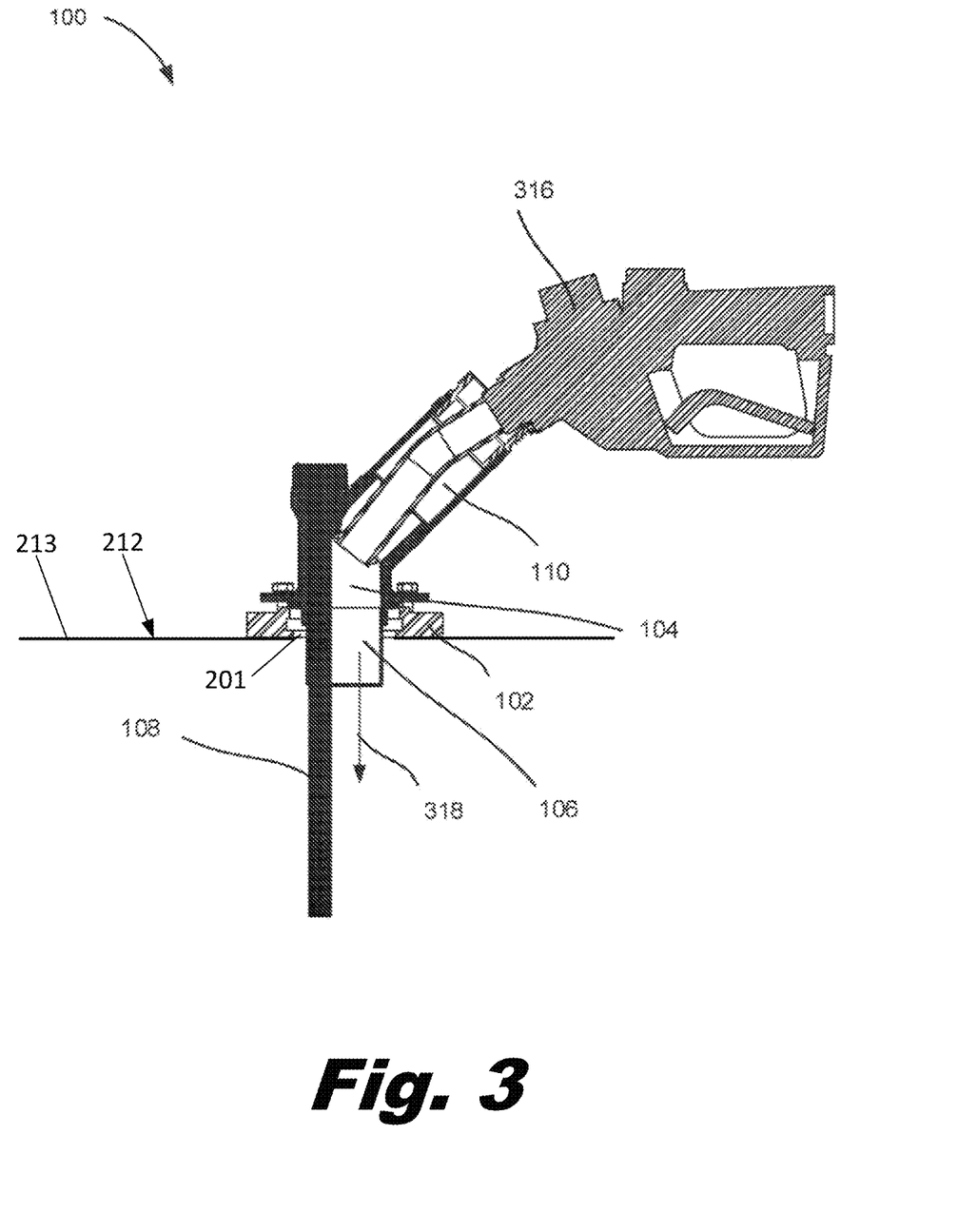
FIG. 3 is a cross-sectional diagram of a fuel measurement device with a fuel passage and a fuel level sensor, according to an example of the principles described herein.

To attach the fuel port (104) to the vehicle or other piece of equipment, the fuel measurement device (100) includes a collar (102) to affix to a neck (201, FIG. 3) of the fuel tank (212, FIG. 3). That is, fuel tanks have an opening through which fuel is added. These openings have necks (201, FIG. 3) that extend outward from the fuel tank (212, FIG. 3). Such necks may allow for a fuel tank cap to be attached and may or may not be threaded. The collar (102) is affixed to this neck (201, FIG. 3) in a variety of ways. For example, as described above, the neck may be threaded. In this example, the collar (102) may have a corresponding threading such that the collar (102) may be threaded onto the neck.

In another example, as will be described below, the collar (102) may have an inside diameter that is slightly smaller than the outside diameter of the neck. Accordingly, the collar (102) may be placed around the neck and tightened such that it clamps around the fuel tank neck. Using such a collar (102) on the existing neck of the fuel tank is advantageous as it allows for the mounting of a fuel port (104) without additional drilling to the tank walls (213, FIG. 3). Additional drilling may reduce the structural integrity of the fuel tank, introduce a leak point, and if done incorrectly, may render the fuel tank inoperable.

The fuel port (104) is then coupled to the collar (102). For example, the fuel port (104) may include holes that align with holes on the collar (102). Bolts may pass through these holes and a nut tightened on the bolt to affix the fuel port (104) to the collar (102). In another example, the collar (102) may include threaded holes. A bolt may be passed through the holes in the fuel port (104) and tightened against the threads in the collar (102) to retain the fuel port (104) against the collar (102). In some examples the holes in the fuel port (104) and the collar (102) are radially disposed around a diameter of either component.

While specific reference is made to particular mechanical fasteners to couple the fuel port (104) to the collar (102), other methods or other types of mechanical fasteners may be used as well. Thus, in this fashion, the fuel measurement device (100) may be retrofitted onto any existing fuel tank opening, without having to modify the fuel tank to receive the fuel measurement device (100). Thus, the fuel measurement device (100) and attendant fuel level sensor (108) may be implemented on a wide variety of vehicles or other pieces of equipment.

As described above, the fuel port (104) includes components that introduce fuel into the fuel tank and that allow for a measurement of fuel level within the fuel tank. Specifically, the fuel port (104) includes an opening (106) through which fuel is passed into the fuel tank. That is, during use, a user directs fuel into the passage (106), for example by positioning a dispenser nozzle into a throat (110), and engages the fuel pump. Such engagement causes fuel to flow through the passage (106) into the fuel tank.

As indicated in FIG. 1, in some cases the fuel port (104) includes a throat (110) to receive the dispenser nozzle. In some examples, the throat (110) is angled relative to the passage (106). Doing so provides for an ergonomic angle through which the dispenser nozzle may be inserted, and rest, during a refueling operation. In some examples, the throat (110) may be formed of a flexible material, such as a rubber material to be more robust to the mechanical interface with a dispenser nozzle as it is inserted and removed from the throat (110). In some examples, the throat (110) may be long enough, and have a diameter to accept standard semi-truck dispenser nozzles.

The fuel port (104) also includes a fuel level sensor (108). The fuel level sensor (108) is disposed in the passage (106). That is, the fuel level sensor (108) extends through the passage (106) into the fuel tank. However, the passage (106) is larger than the fuel level sensor (108) such that during a refueling operation, fluid readily flows through the passage (106) without interference from the fuel level sensor (106).

The fuel level sensor (108) measures a level of fluid within a fuel tank and sends a measurement value to a computing system which can then convert the level of fuel, which may be indicated as a depth of fuel, into a volume of fuel. The fuel level sensor (108) may be any type of sensor. For example, the fuel level sensor (108) may be a capacitive level sensor that includes a probe extending through a fuel tank. The capacitive level sensor measures a capacitance along a probe length and converts the capacitance into a depth of fuel in the fuel tank. For example, a fuel tank having a first level of fuel will result in a first capacitive reading and a second level of fuel will result in a second capacitive reading. In this example, the computing system to which the fuel level sensor (108) is coupled includes a database that includes a mapping between a detected depth of fuel and a volume of fuel within the at least one fuel tank.

Accordingly, the presently described fuel measurement device (100) describes a combined fuel inlet and fuel level sensor (108) that are fitted to an existing opening of a vehicle or piece of equipment. The mounting of the fuel measurement device (100) via a collar (102) section and a fuel port section (104) allow for the mounting without modification nor alteration to the structure of the fuel tank thus facilitating a simple, robust, and efficient addition of a fuel measurement device (100) to any fuel tank.

Figure 2:
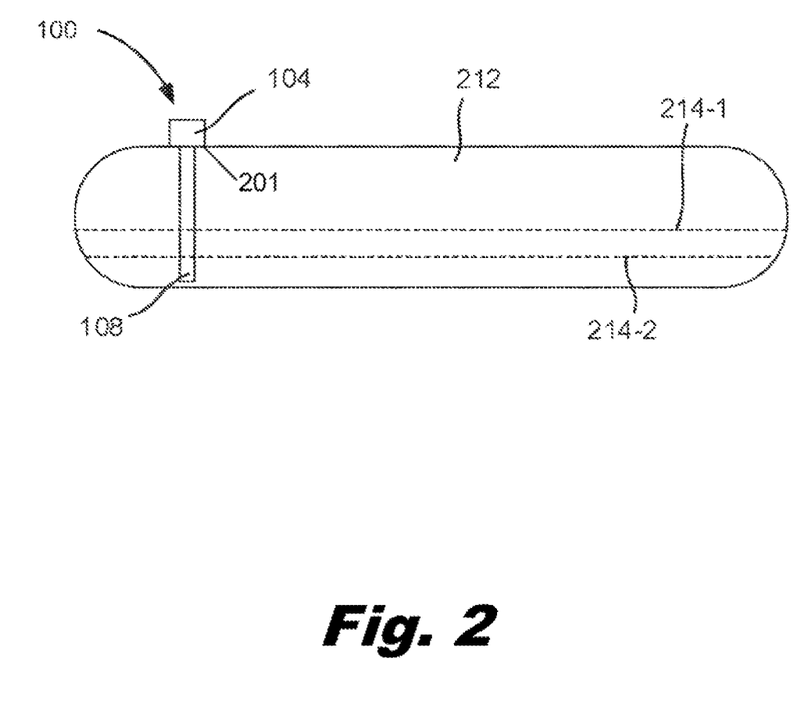
FIG. 2 is a cross-sectional view of a fuel measurement device with a fuel passage and a fuel level sensor as inserted into a fuel tank, according to an example of the principles described herein.

FIG. 2 is an isometric view of a fuel port (104) as inserted into a fuel tank (212), according to an example of the principles described herein. As described above, the fuel port (104) includes a fuel level sensor (108) that extends through the full depth of the fuel tank (212). Note that the components depicted in FIG. 2 are not drawn to scale with some components enlarged for simplicity in identifying certain components.

As described above, the fuel level sensor (108) is a component placed in a fuel tank (212) to determine fuel depth in the fuel tank (212). While FIG. 2 depicts a fuel tank (212) having a particular shape and size, the fuel measurement device (100) depicted in FIG. 2 and described herein may be used on any shape and size of fuel tank (212).

The fuel level sensor (108) may be a capacitive level sensor. A capacitive level sensor measures a capacitance along a probe length and converts the capacitance into a depth of fuel in the fuel tank (212). For example, a fuel tank (212) at one point in time may have a first level (214-1) of fuel, Over time as the equipment or vehicle is operated and fuel is consumed, the fuel level drops to a second level (214-2). The different levels (214) of fuel result in different outputs from the fuel level sensor (108).

A capacitive fuel level sensor (108) includes conductive plates separated from one another. Electrical capacitance exists between the plates and a change in medium between the plates results in a change of capacitance. Accordingly, as the fuel level (214) changes over time, so does the associated capacitance level. Accordingly, the fuel level sensor (108) may output different capacitance measurements at different points in time, the different capacitance measurements indicating different fuel levels within the fuel tank (212). In this example, the computing system to which the fuel level sensor (108) is coupled includes a database that includes a mapping between a detected depth of fuel and a volume of fuel within the fuel tank (212).

FIG. 3 is a cross-sectional diagram of a fuel measurement device (100) with a fuel passage (106) and a fuel level sensor (108), according to an example of the principles described herein. FIG. 3 also depicts a dispenser nozzle (316) disposed within the throat (110) of the fuel port (104). As is clearly indicated in FIG. 3, the dispenser nozzle (316) extends into the throat (110) such that fuel flowing from the dispenser nozzle (316) passes into the passage (106) of the fuel port (104) and from there into the fuel tank (FIG. 2, 212). FIG. 3 also depicts the fuel level sensor (108) extending through the passage (106) in such a fashion that fuel flow is not obstructed. That is, even with the fuel level sensor (108) disposed within the passage (106), fluid can pass into the fuel tank (FIG. 2, 212) as indicated by the arrow (318).

Figure 4:
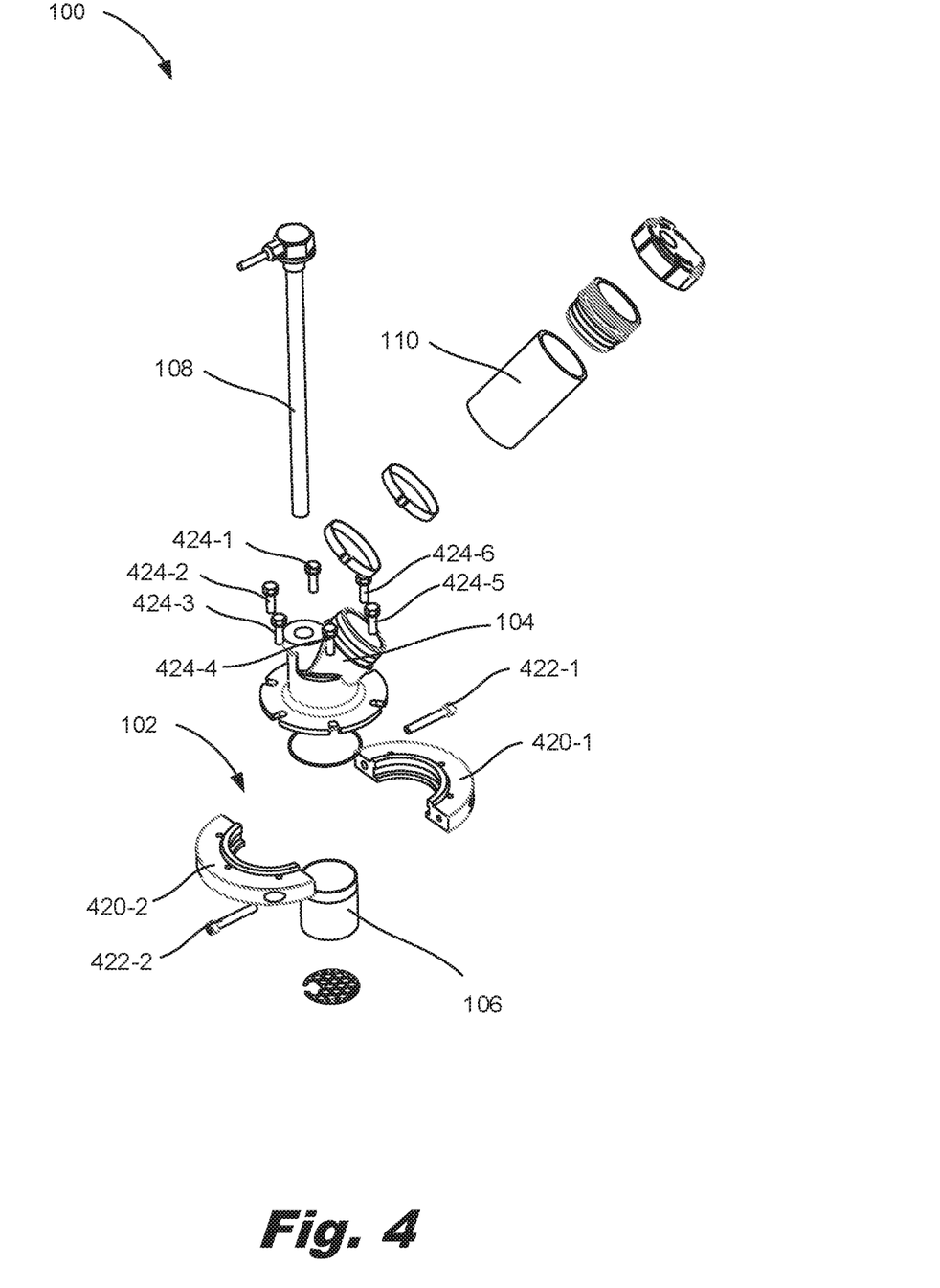
FIG. 4 is an exploded view of a fuel measurement device with a fuel passage and a fuel level sensor, according to an example of the principles described herein.

FIG. 4 is an exploded view of the fuel measurement device (100) with a fuel passage (106) and the fuel level sensor (108), according to an example of the principles described herein. FIG. 4 clearly illustrates the affixation of the collar (102) to the neck of the fuel tank (FIG. 2, 212) as well as the affixation of the fuel tank port (104) to the collar (102).

As described above, in one example the collar (102) clamps against, and forms an interference fit with, the neck of the fuel tank (FIG. 2, 212). In this example, the collar (102) may be divided into multiple sections (420-1, 420-2). The sections (420) may be coupled to one another via mechanical fasteners (422-1, 422-2) that pass through adjacent holes. In the example depicted in FIG. 4, the mechanical fasteners are bolts, but other mechanical fasteners may be implemented as well Upon installation, the collar (102) is placed around the outside diameter of the neck of the fuel tank (FIG. 2, 212). Bolts are then placed through corresponding holes in either section (420-1, 420-2) of the collar (102). It should be noted that the inside diameter of the collar (102) may be less than the outside diameter of the neck of the fuel tank (FIG. 2, 212). Accordingly, as the bolts are tightened, the sections (420-1, 420-2) are tightened against one another and clamp around an outside diameter of the neck of the fuel tank (FIG. 2, 212). In this example, the collar (102) is now rigidly coupled to the fuel tank (FIG. 2, 212) thus providing a solid base to which the fuel port (104) is attached.

FIG. 4 also clearly illustrates the attachment of the fuel port (104) to the collar (102). Such an attachment may be facilitated by another set of mechanical fasteners (424-1, 424-6) which may be bolts or screws. That is, a collar of the fuel port (104) may include holes that align with holes (threaded or unthreaded) on the collar (102). After the fuel port (104) has been positioned, that is placed such that the fuel level sensor (108) is inside the fuel tank (FIG. 2, 212), and the throat (110) aligned as desired, mechanical fasteners (424-1-424-6) such as bolts may be used to rigidly couple the fuel port (104) to the collar (102). Such a rigid coupling may be desirable as movement of the fuel port (104) complicates refueling, can damage the fuel measurement device (100) components during transit and may impact the ability of the fuel level sensor (108) to detect fuel levels within the fuel tank (FIG. 2, 212).

As depicted in FIG. 4, the mechanical fasteners (424) that couple the fuel port (104) to the collar (102) may be perpendicular to those that clamp the collar (102) against the neck of the fuel tank (FIG. 2, 212). For example, the mechanical fasteners (422) that join the collar (102) to the neck of the fuel tank (FIG. 2, 212) may be parallel to a surface of the neck and the mechanical fasteners (424) that join the fuel port (104) to the collar (102) may be perpendicular to this plane.

Figure 5:
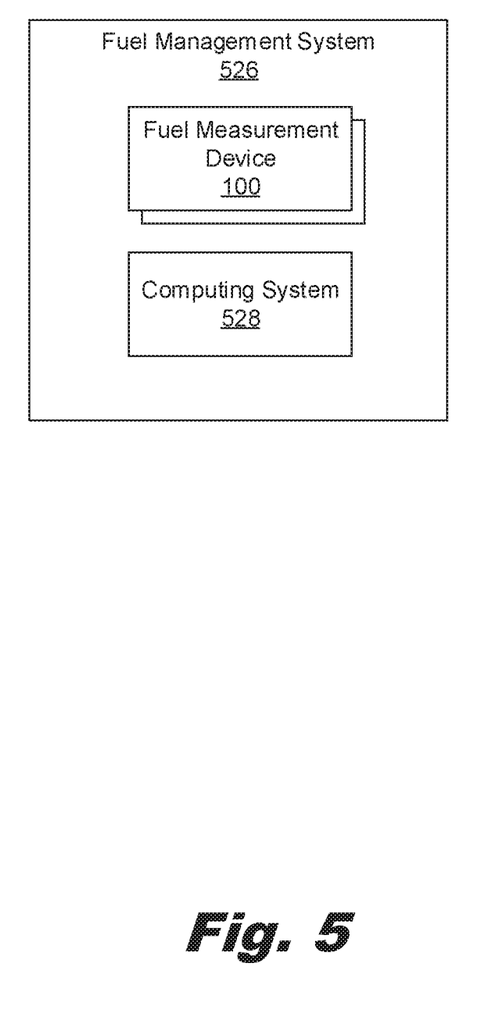
FIG. 5 is a block diagram of a fuel management system, according to an example of the principles described herein.

FIG. 5 is a block diagram of a fuel management system (526), according to an example of the principles described herein. The fuel management system (526) in general refers to a system that provides information regarding fuel consumption. Using this information decisions regarding vehicle and/or fleet operation can be made. The fuel management system (526) includes at least one fuel measurement device (100) as described above. Each fuel measurement device (100) in the fuel management system (526) may include a collar (FIG. 1, 102) to attach to a respective fuel tank (FIG. 2, 212), and a fuel port (FIG. 1, 104) with the attendant passages (FIG. 1, 106) and fuel level sensors (FIG. 1, 108) as described above.

The fuel management system (526) also includes a computing system (528) with a data connection with the fuel measurement device(s) (100). The computing system (528) receives fuel level measurement information from the fuel level sensor(s) (100) and determines a quantity of fuel in the fuel tank.

In some examples the fuel measurement device(s) (100) are wirelessly connected to the computing system (528). In other cases, the fuel measurement device(s) (100) have hardwire connections to the computing system (528). In either example, a fuel depth value is sent via an electronic message path to the computing system (528), which may be in the cab of the vehicle or at a remote location. The computing system (528) may convert the depth value to a volumetric reading, such as gallons. In some examples, the volumetric reading is passed to the remote location for further processing. The process of taking measurements and processing the measurements may be done over a period of time. For example, fluid level measurements may be collected every 5 minutes and a corresponding volumetric amount calculated. Doing so may allow an operator of the vehicle or, an operator of a fleet of vehicles, to track rates of fuel usage.

In some examples, the computing system (528) may be coupled to multiple fluid measurement devices (100). For example; it may be the case that a vehicle, such as a semi-truck, may have multiple fuel tanks (FIG. 2, 212). Accordingly, the fuel management system (526) may include multiple fuel measurement devices (100), each disposed in a different fuel tank (FIG. 2; 212). In this example, the computing system (528) collects fuel depth information for each fuel tank (FIG. 2, 212), converts each to a volumetric value, and aggregates the volumetric values for the multiple fuel tanks (FIG. 2, 212) such that an accurate overall fuel measurement is provided.

The data from the fuel measurement devices (100) may be used in isolation; that is as a simple measure of volume of fluid available; or may be combined with other information to provide additional in-depth fuel consumption characteristics. For example, by including timestamps with fuel level measurements, the computing system (528) may determine fuel used over a period of time. In other examples, timestamped fuel level measurements allow the computing system (528) to determine how much fuel was added during a refueling operation or how much fuel has been removed.

In one specific example of using fuel level measurements with other information, the computing system (528) may be able to determine fuel pump accuracy, That is, as a vehicle operator is at a refueling station, a certain amount of fluid is added to the fuel tank (FIG. 2, 212), which may or may not be different from an amount indicated on a sales record from the fuel vendor. A discrepancy between these values may result in a loss to a vehicle operator or a fleet operator as the operator is charged for more fuel than they are actually provided with. Accordingly, using a sales record from a fuel vendor and the fuel level measurements taken over a refueling period, the computing system (528) may determine whether or not there is a discrepancy between what is indicated on a sales record and what is actually added to the fuel tank (FIG. 2, 212).

As an additional example, the computing system (528) may determine a fuel economy. With such information on hand, an operator may take remedial action when measured fuel economy does not match up with what is expected. For example, a low fuel economy may indicate some malfunctioning component of the vehicle.

As another example, the computing system (528) may determine a driver efficiency. For example, driving certain vehicles such as semi-trucks require a knowledge of certain best practices to enhance vehicle performance and to increase fuel economy. For example, proper shifting can increase fuel economy. Other driving characteristics can also have an impact on fuel economy. Moreover, a driver who repeatedly gets lost may negatively affect fleet operations as they cost the fleet more money in fuel costs. Accordingly, the computing system (528) may determine from fuel level information whether fuel economy or fuel usage for a particular driver is in an expected range.

The computing system (528) may also determine information that protects against malfeasance. For example, it may be the case that a nefarious party attempts to steal fuel from a fuel tank (FIG. 2, 212), The computing system (528) may be able to determine that fuel is being withdrawn at a time when it is unexpected, for example when the vehicle is turned off. In another example, the computing system (528) determines that fuel is being withdrawn faster than is expected during normal use, which anomaly may be indicative of fuel theft.

The computing system (528) may also determine information indicative of vehicle performance. For example, the computing system (528) may take fuel level measurements over a period of time and determine that even when the vehicle is not in use, fuel level is steadily going down, albeit at a slower rate. Such information may be indicative of a leak in the fuel tank (FIG. 2, 212). Moreover, as described above, fuel economy below a certain expected level may indicate that another component of the vehicle is not operating as expected.

As yet another example, the computing system (528) may output fuel economy recommendations. For example, an output of the computing system (528) may indicate a particular fuel economy for the vehicle. An operator of the vehicle may consider this information and determine that an update to the vehicle, or a new vehicle, should be purchased to improve fuel consumption characteristics.

In some examples, the computing system (528) may include a network connection to a remote location. In this example, information determined by the computing system (528) may be transmitted to a remote location, such as a fleet headquarters. In this example, the information gathered is compiled and analyzed to drive fleet operational decisions.

In addition to making such determinations, the computing system (528) may provide notifications to an operator of the vehicle and/or an operator of the fleet to which the vehicle pertains. That is, notifications regarding the usage of fuel may be provided to an operator. Such may be in the form of a digital readout or a digital gauge presented on the in-cab computing system (528) or other type of display device. Such notifications may be used to coach the driver to better fuel economy.

In addition to presenting the information regarding available fuel amounts, the computing system (528) may provide notifications of anomalies and/or outliers regarding fuel usage. For example, the computing system (528) may include a database of expected fuel consumption characteristics, such as fuel economy, fuel added, and fuel used etc. When collected fuel level information does not align with the expected amounts, notifications may be provided to a user of the vehicle or a manager of the vehicle. As described above, any number of causes may be related to an unexpected fuel consumption including but not limited to malfeasance, component malfunction, or operator error.

Accordingly, the fuel management system (526) by collecting fuel level information from a fuel level sensor (100) and determining different fuel usage characteristics based on such fuel level information presents a mechanism where by fuel usage in general can be more closely monitored and used to manipulate fuel usage operations.

Figure 6:
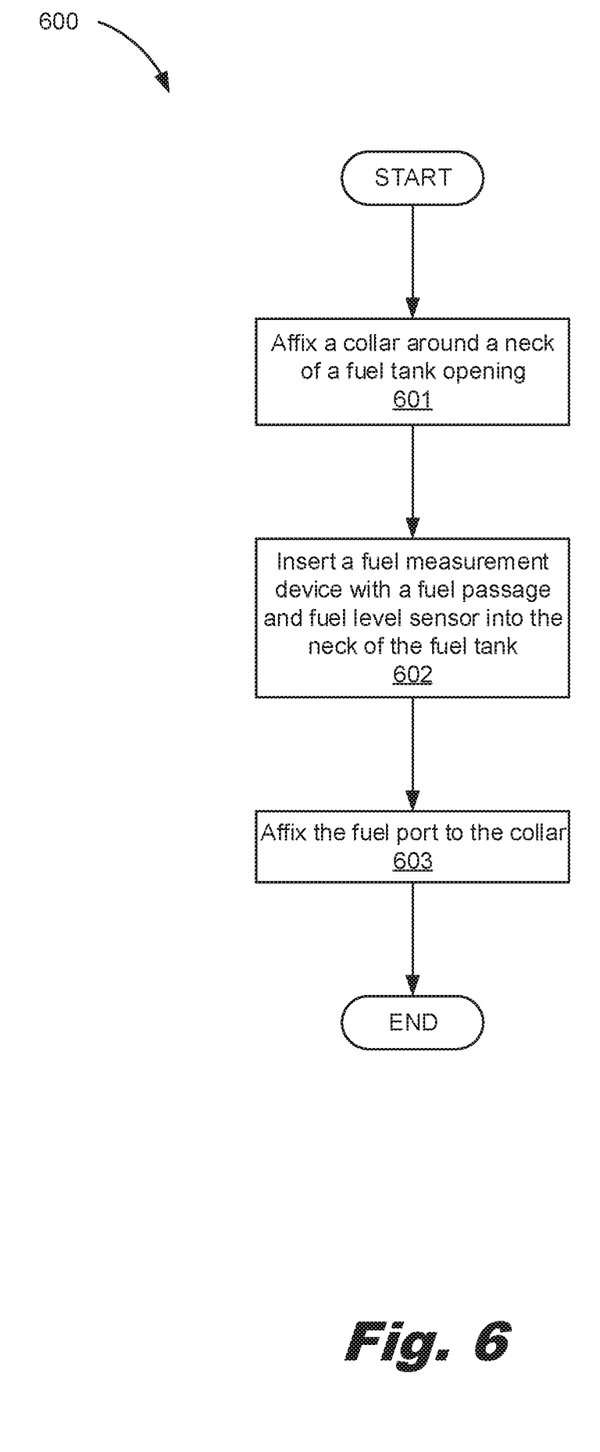
FIG. 6 is a flow chart of a method for assembling a fuel measurement device with a fuel passage and a fuel level sensor, according to an example of the principles described herein.

FIG. 6 is a flow chart of a method (600) for assembling a fuel measurement device (FIG. 1, 100) with a fuel passage (FIG. 1, 106) and a fuel level sensor (FIG. 1, 108), according to an example of the principles described herein. As described above, the fuel measurement device (FIG. 1, 100) of the present specification is installable onto a fuel tank (FIG. 2, 212) without any structural modification to the fuel tank (FIG. 2, 212). As such the structural integrity of the fuel tank (FIG. 2, 212) is uncompromised. Being attached without modification to the fuel tank (FIG. 2, 212) also allows for the selective removal of the fuel port (FIG. 1, 104) and fuel level sensor (FIG. 1, 108) from the fuel tank (FIG. 2, 212). For example, in the event that the fuel level sensor (FIG. 1, 108) is no longer operational due to an expired lifetime or due to a malfunction of a component, the fuel level sensor (FIG. 1, 108) may be easily removed for repair or replacement.

According to the method (600), a collar (FIG. 1, 102) is affixed (block 601) around a neck of a fuel tank (FIG. 2, 212) opening. In one example, a threaded collar (FIG. 1, 102) may be screwed onto a thread neck. In another example, the collar (FIG. 1, 102) includes various sections (FIG. 4, 420) that when joined have an inside diameter slightly smaller than an outside diameter of the neck of a fuel tank (FIG. 2, 212). These sections may be positioned around the neck and tightened, for example via bolts, such that the sections (FIG. 4, 420) clamp (block 601) against the neck.

The fuel measurement device (FIG. 1, 100) is then inserted (block 602) through the neck. That is, the fuel level sensor (FIG. 1, 108) which may be an elongated probe, is extended through the neck into the volume of the fuel tank (FIG. 2, 212), Once inserted, the fuel measurement device (FIG. 1, 100) is affixed (block 603) to the collar (FIG. 1, 102), for example via mechanical fasteners (FIG. 4, 424). As described above, in one specific example, the mechanical fasteners (FIG. 4, 424) may be bolts that pass through aligned holes of the fuel port (FIG. 1, 104) and the collar (FIG. 1, 102). Such a method (600) allows for a fuel level sensor (FIG. 1, 108) to be removably coupled to a fuel tank (FIG. 2, 212) without alteration to the structure of the fuel tank (FIG. 2, 212) and without inhibiting the introduction of fuel into the fuel tank (FIG. 2, 212).

In some examples, the method (600) also includes establishing a data transmission path between the fuel level sensor (FIG. 1, 108) and the computing system (FIG. 5, 528) which computing system (FIG. 5, 528) is disposed in a cab of a vehicle on which the fuel port (FIG. 1, 104) is disposed. As described above, such a data transmission path may be hardwired in which case such a connection is stablished via connectors coupled respectively to the fuel level sensor (FIG. 1, 108) and the computing system (FIG. 5, 528). In the example where the data transmission path is a wireless connection, a handshake operation is executed such that the fuel level sensor (FIG. 1, 108) is recognized by, and can transmit data with the computing system (FIG. 5, 528).

Figure 7:
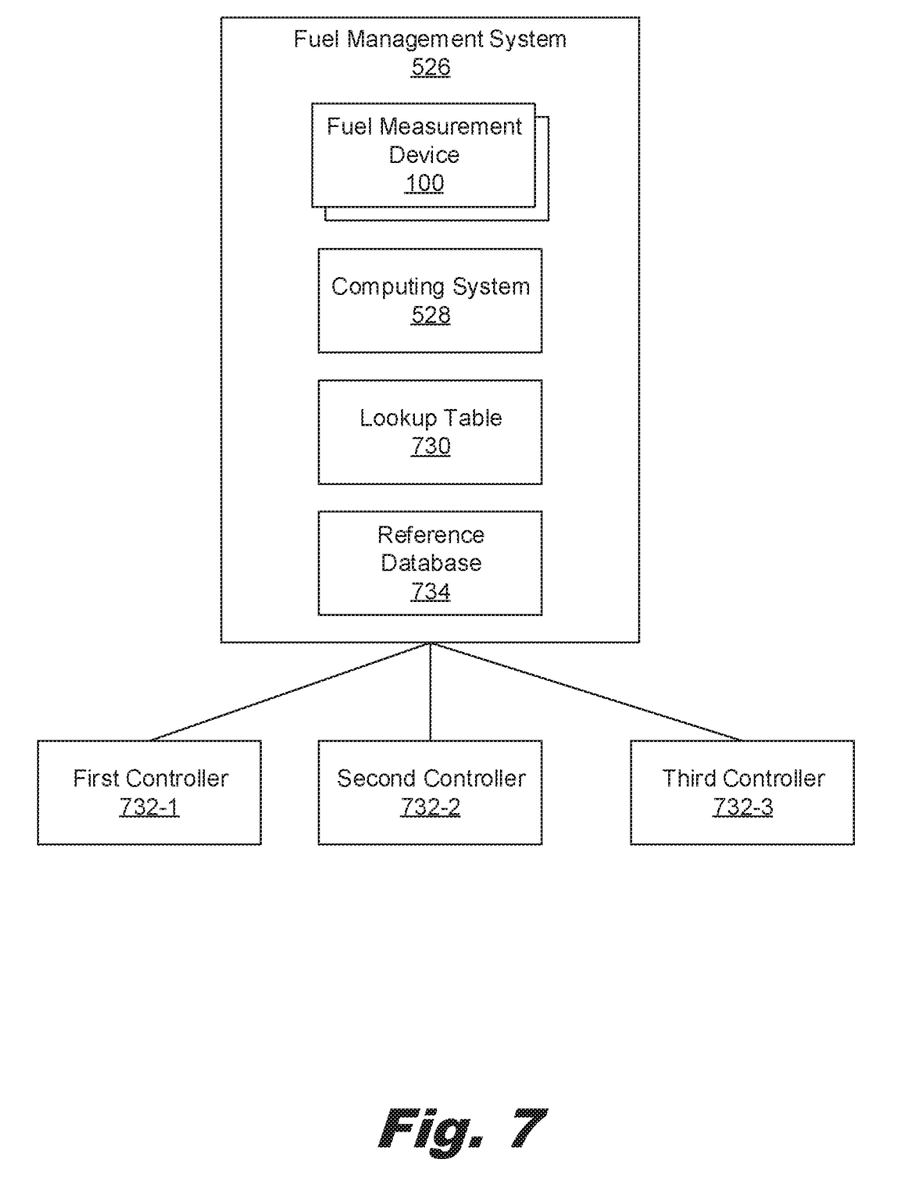
FIG. 7 is a block diagram of a fuel management system, according to another example of the principles described herein.

FIG. 7 is a block diagram of a fuel management system (526), according to another example of the principles described herein. As described above, the fuel management system (526) includes the fuel measurement device(s) (100) as well as the computing system (528). In some examples, the fuel management system (526) includes additional components.

For example, the fuel management system (526) may include a lookup table (730) to map fuel depth values to quantities of fuel in the fuel tank (FIG. 2, 212). As described above, a fuel level sensor (FIG. 1, 108) may take different capacitive measurements that correspond to a particular depth of fluid as measured along the length of the probe. However, a depth value may not be useful to a vehicle or fleet operator. Accordingly, the computing system (528) converts the depth value to a volumetric reading. However, a mapping between depth of fuel and volume of fluid is dependent upon a shape and size of the fuel tank (FIG. 2, 212) in which the fuel level sensor (FIG. 1, 108) is disposed. Accordingly, the lookup table (730) may be indexed based on size and shape characteristics of the particular fuel tank (FIG. 2, 212) in which the fuel level sensor (FIG. 1, 108) is disposed. As a specific example, each fuel tank (FIG. 2, 212) may be identified within memory of the lookup table (730) by an identification number which may be a heading for a table of fuel depth to fuel volume measurements for that fuel tank (FIG. 2, 212). The lookup table (730) may include such information for various fuel tanks (FIG. 2, 212).

As a specific example of the fuel management system (528), the fuel level sensors (FIG. 1, 108) mounted in the fuel tanks (FIG. 2, 212) send a fluid level measurement to the computing system (528). The computing system (528) then converts the fluid level to a volume level remaining in the fuel tank (FIG. 2, 212) based on the information contained in the lookup table (730). The computing system (528) then displays information such as fuel amount remaining. In addition to a simple fuel amount remaining value, the computing system (528) may output a variety of different types of fuel consumption characteristics fuel economy over time, and anomalies and outliers from expected fuel consumption.

In some examples, the computing system (528) calculates a number of additional fuel consumption characteristics based in part on the fuel level measurements. To generate such data, the computing system (528) may collect information from other controllers (732) to provide the additional fuel consumption information. The other information collected may be of a variety of types and may be used in different ways. For example, the other information may include vehicle status information, i.e., whether the vehicle is turned on or not, vehicle movement information, vehicle electrical status information, i.e., whether the battery is connected, vehicle odometer information, vehicle tachometer information, vehicle global positioning information, date information, and time information. Historical information for this different information may also be preserved.

This information can be used in a number of ways to provide fuel consumption information. For example, the computing system (528) may use vehicle status information from a first controller (732-1) to determine whether fuel is leaking or fuel is being removed. For example, if the first controller (732-1) indicates a vehicle ignition is off, yet the fuel level sensor (FIG. 1, 108) indicates that fuel level is dropping, it may be the case that there is a leak somewhere in the fuel transport system or that a third party is nefariously removing fluid from the vehicle.

In another example, vehicle movement information, date information, and time information from respective controllers (732) in conjunction with the fluid level information from the fuel level sensor (FIG. 1, 108) may indicate that fuel quantity is dropping at a rate of x gallons per mile. If such a value is less than expected, as compared against a database (734) in the computing system (528), it may be determined that 1) a driver is operating the vehicle inefficiently, 2) the vehicle components are not operating as expected, or 3) that there may be a leak in the fuel tank (FIG. 2, 212).

While particular reference is made to certain controllers (732) and certain other information collected therefrom, various other examples are conceivable wherein fluid level information may be used along with other information that the computing system (528) receives from various other controllers (732) to determine how fuel is being used such that fuel usage may be more closely monitored for inefficiencies and so that required remedial actions may be carried out.

In some examples, the fuel management system (526) may include a reference database (734) that includes expected fuel consumption values. For example, the reference database (734) may indicate an expected fuel economy given a particular route for a vehicle, or an expected fuel economy given historical fuel economy values. In some examples, the values in the reference database (734) may be set by a user, or may be learned over time based on data regarding historical fuel consumption for the vehicle specifically, or for vehicles in general.

In summary, using such a fuel measurement device 1) allows for accurate determination of fuel levels within a fuel tank; 2) is used with a fuel tank without structural alteration of the fuel tank; and 3) provides data which alone, or with other data, provides detailed information regarding fuel usage of a particular vehicle.

What is claimed is:

1. A fuel measurement device, comprising:
   a collar to clamp against a neck of a fuel tank, where the neck extends outward from the fuel tank at an opening into an interior of the fuel tank;
   a fuel port coupled to the collar, the fuel port comprising:
   a passage through which fuel is passed into the fuel tank; and
   a fuel level sensor comprising an elongated probe inserted into the fuel tank;

wherein the collar is divided into multiple sections, each section being tightened against an adjacent section to clamp against the neck of the fuel tank.

2. The device of claim 1, wherein the fuel level sensor passes into the fuel tank through the passage.

3. The device of claim 1, further comprising a computing system in communication with the fuel level sensor, the computing system programmed to detect a possible fuel leak or theft based on output from the fuel level sensor.

4. The device of claim 1, wherein the computing system is programmed to determine an indication of possible driver inefficiency based on output from the fuel level sensor.

5. The device of claim 1, wherein:
the multiple sections are attached to each other by mechanical fasteners that pass through adjacent holes of respective sections of the collar.

6. The device of claim 1, further comprising a throat formed of a flexible material, wherein the throat is attached to the fuel port and configured to receive a dispenser nozzle.

7. The device of claim 6, wherein the throat is angled relative to the passage.

8. A method, comprising:
affixing a collar to a neck of a fuel tank opening, where the neck extends outward from the fuel tank at an opening into an interior of the fuel tank;
inserting a fuel measurement device comprising a fuel passage and a fuel level sensor into the fuel tank opening; and
affixing the fuel measurement device to the collar via mechanical fasteners;
wherein the mechanical fasteners that affix the fuel measurement device to the collar are perpendicular to fasteners that clamp the collar to the neck of the fuel tank.

9. The method of claim 8, wherein the collar comprises threads for securing the collar to corresponding threads of the neck of the fuel tank.

10. The method of claim 8 further comprising establishing a data transmission path between the fuel level sensor and a computing system in a cab of a vehicle on which the fuel measurement device is disposed.

11. A fuel management system comprising:
at least one fuel measurement device, comprising:
a collar to clamp against a neck of a respective fuel tank;
a fuel port coupled to the collar, wherein the fuel port is coupled to the collar via mechanical fasteners, the fuel port comprising:
a passage through which fuel is passed into the respective fuel tank; and
a fuel level sensor comprising an elongated probe inserted through the passage into the respective fuel tank; and
a computing system with a data connection with the at least one fuel measurement device, the computing system to:
receive a fluid level measurement from each fuel measurement device; and
determine a quantity of fuel in each fuel measurement device.

12. The fuel management system of claim 11, wherein the computing system is coupled to multiple fuel measurement devices, each fuel measurement device being disposed in a different fuel tank.

13. The fuel management system of claim 11, wherein the computing system receives fluid level measurements and determines the quantity of fuel periodically over a period of time.

14. The fuel management system of claim 11, wherein fuel level sensors are wirelessly connected to the computing system.

15. The fuel management system of claim 11, wherein fuel level sensors are connected via a wire to the computing system.

16. The fuel management system of claim 11, further comprising a tank lookup table to map fuel depth values to volumetric quantities of fuel.

17. The fuel management system of claim 11, wherein the computing system provides a notification of the quantity of fuel in the fuel tank.

18. The fuel management system of claim 11, wherein the computing system determines from the fluid level measurement, an indication of possible
fuel leakage; or
fuel theft.

19. The fuel management system of claim 11, wherein the computing system collects other information from other controllers to provide additional fuel consumption information.

20. The fuel management system of claim 11, wherein the computing system determines fuel quantity by:
determining a fuel depth in a fuel tank; and
converting the fuel depth to a fuel volume.

* * * * *